(12) United States Patent
North et al.

(10) Patent No.: US 11,836,522 B2
(45) Date of Patent: Dec. 5, 2023

(54) SYSTEM AND METHOD OF MANAGING TEMPERATURES OF SURFACES OF INFORMATION HANDLING SYSTEMS

(71) Applicant: Dell Products L.P., Round Rock, TX (US)

(72) Inventors: Travis Christian North, Cedar Park, TX (US); Daniel Lawrence Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 473 days.

(21) Appl. No.: 17/209,895

(22) Filed: Mar. 23, 2021

(65) Prior Publication Data

US 2022/0308924 A1  Sep. 29, 2022

(51) Int. Cl.
*G06F 9/46* (2006.01)
*G06F 9/48* (2006.01)
*G06F 1/20* (2006.01)
*G06F 11/34* (2006.01)
*G06F 11/30* (2006.01)

(52) U.S. Cl.
CPC ............ *G06F 9/4893* (2013.01); *G06F 1/203* (2013.01); *G06F 11/3044* (2013.01); *G06F 11/3058* (2013.01); *G06F 11/3438* (2013.01)

(58) Field of Classification Search
CPC ... G06F 1/203; G06F 11/3044; G06F 11/3058
See application file for complete search history.

(56) References Cited

PUBLICATIONS

Cutress, I. (Jan. 8, 2018). *Intel core with Radeon RX Vega M graphics launched: HP, Dell, and Intel NUC.* AnandTech: Hardware News and Tech Reviews Since 1997. https://www.anandtech.com/show/12220/how-to-make-8th-gen-more-complex-intel-core-with-radeon-rx-vega-m-graphics-launched.

*Primary Examiner* — Gregory A Kessler
(74) *Attorney, Agent, or Firm* — McDermott Will & Emery LLP

(57) ABSTRACT

In one or more embodiments, one or more systems, one or more methods, and/or one or more processes may determine an identification of an application executing on an information handling system (IHS); determine a first performance profile based at least on a policy and based at least on the identification of the application; configure a processor to utilize power up to a first power level based at least on the first performance profile; determine that a user physically utilizes at least one human input device of the IHS within an amount of time transpiring; receive information indicating that the user is physically in contact with the IHS; determine a second performance profile based at least on the policy and based at least on the information; and configure the processor to utilize power up to a second power level based at least on the second performance profile.

20 Claims, 8 Drawing Sheets

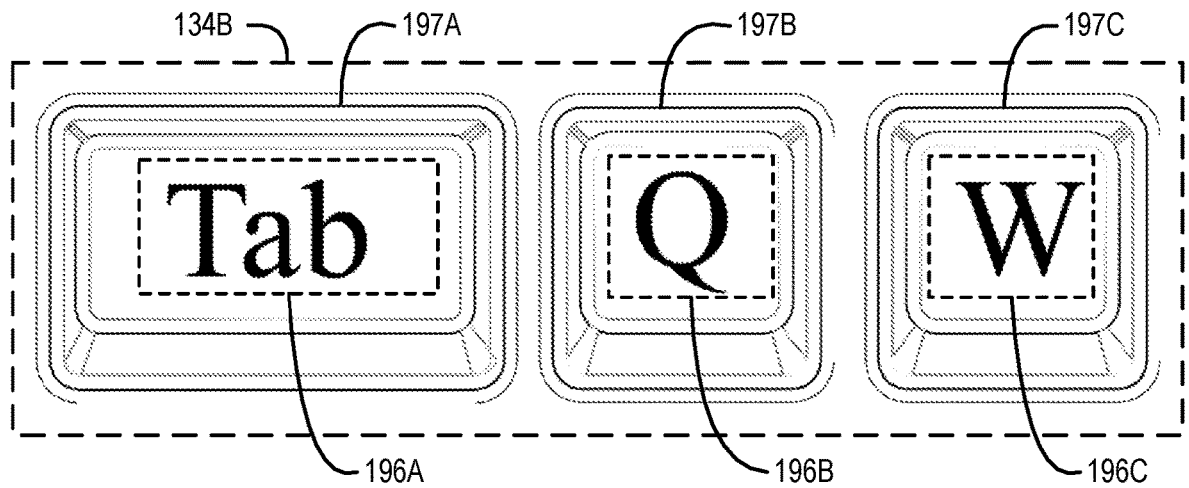
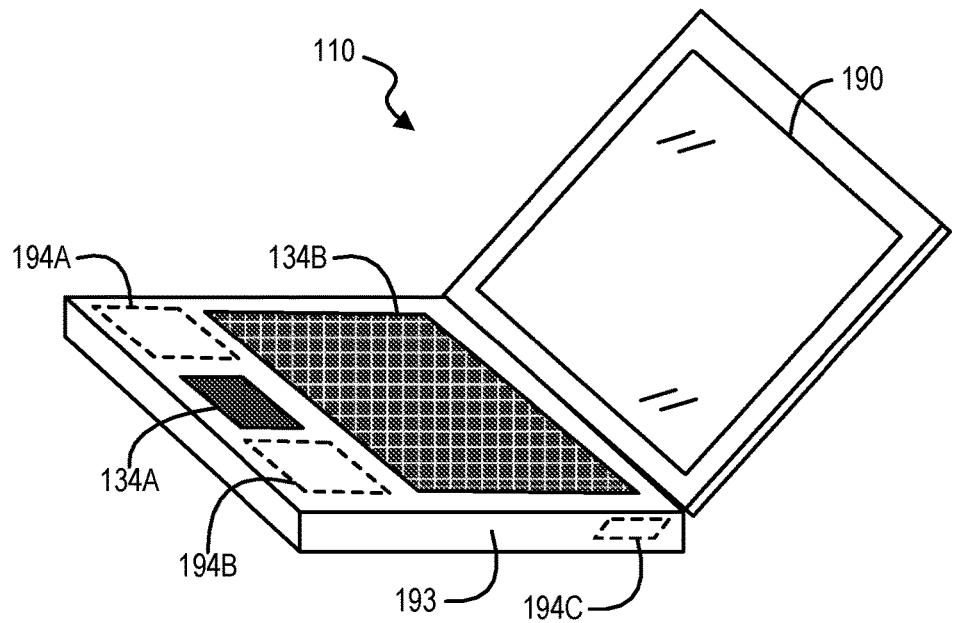
FIG. 1C

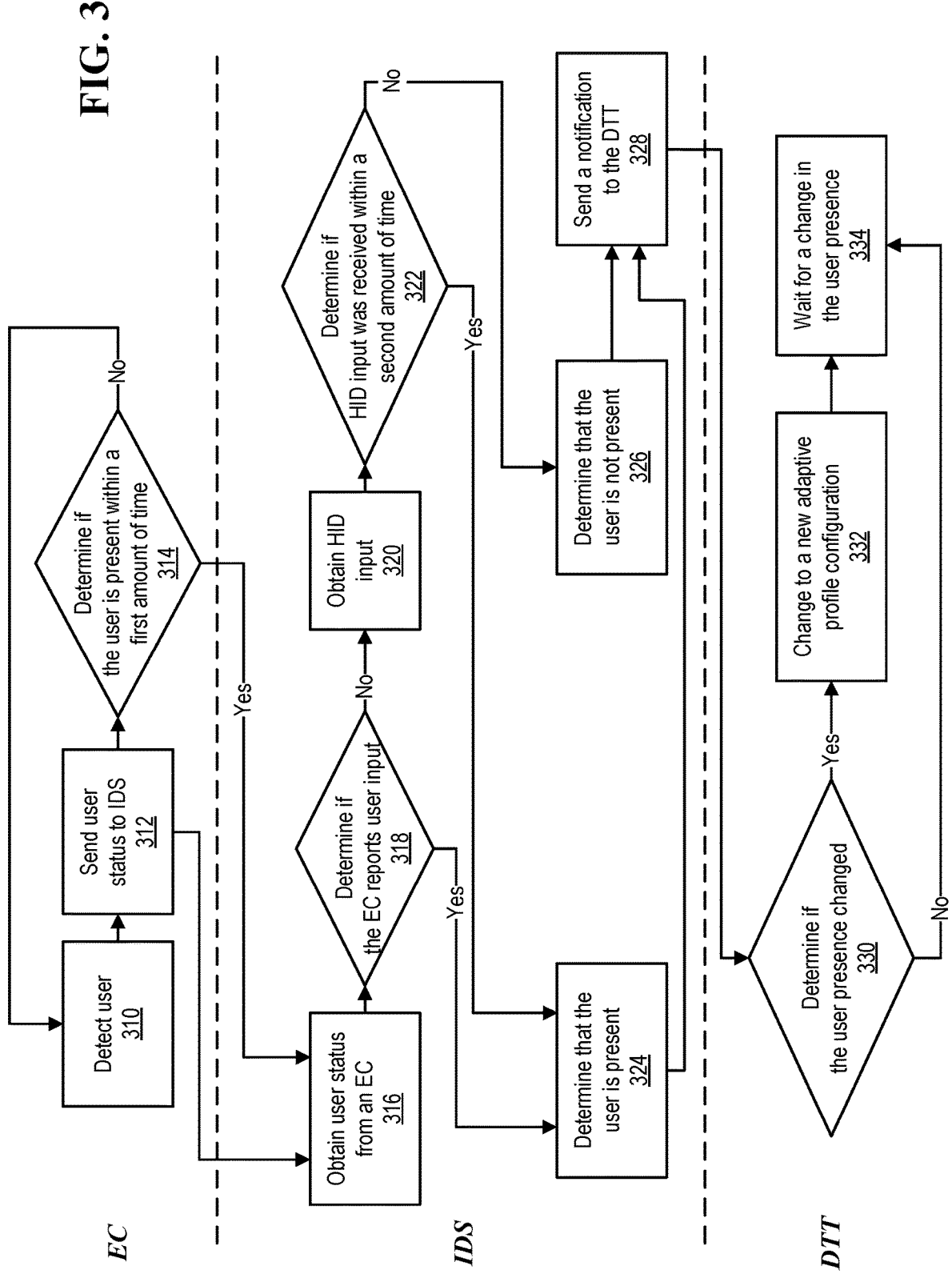

SYSTEM AND METHOD OF MANAGING TEMPERATURES OF SURFACES OF INFORMATION HANDLING SYSTEMS

BACKGROUND

Field of the Disclosure

This disclosure relates generally to information handling systems and more particularly to managing temperatures of surfaces of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may determine, by a first background process executed by at least one processor of an information handling system, an identification of an application executing on the information handling system; may determine, by the first background process, a first performance profile based at least on a policy and based at least on the identification of the application; may configure, by the first background process, the at least one processor to utilize power up to a first power level based at least on the first performance profile; may determine, by an embedded controller of the information handling system, that a user physically utilizes at least one human input device (HID) of the information handling system within an amount of time transpiring; may receive, by the first background process, information indicating that the user is physically in contact with the information handling system from the embedded controller; in response to receiving the information, may determine, by the first background process, a second performance profile based at least on the policy and based at least on the information indicating that the user is physically in contact with the information handling system; and may configure, by the first background process, the at least one processor to utilize power up to a second power level based at least on the second performance profile, wherein the second power level is less than the first power level.

In one or more embodiments, the one or more systems, the one or more methods, and/or the one or more processes may further: receive, by the embedded controller, a notification that indicates the user has utilized the at least one HID; determine, by the embedded controller, that the user is physically in contact with the information handling system based at least on the notification; and provide, by the embedded controller, the information indicating that the user is physically in contact with the information handling system to the first background process. In one or more embodiments, the one or more systems, the one or more methods, and/or the one or more processes may further: receive, by a second background process executed by the at least one processor, user input from the at least one HID; and provide, by the second background process, the notification to the embedded controller that indicates the user has utilized the at least one HID.

In one or more embodiments, the at least one HID may include at least one of a keyboard, a touchpad, and a touch screen. In one or more embodiments, the embedded controller may be a microcontroller that is physically separate from the at least one processor. In one or more embodiments, configuring, by the first background process, the at least one processor to utilize power up to the second power level based at least on the second performance profile may include reducing a temperature of at least one outer portion of a chassis of the information handling system. In one or more embodiments, configuring, by the first background process, the at least one processor to utilize power up to the second power level based at least on the second performance profile may include reducing a temperature of at least one surface of a key of a keyboard of the information handling system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIGS. 1A-1D illustrate examples of an information handling system, according to one or more embodiments;

FIG. 3 illustrates an example of a method of operating an information handling system, according to one or more embodiments.

DETAILED DESCRIPTION

Figure 1A:
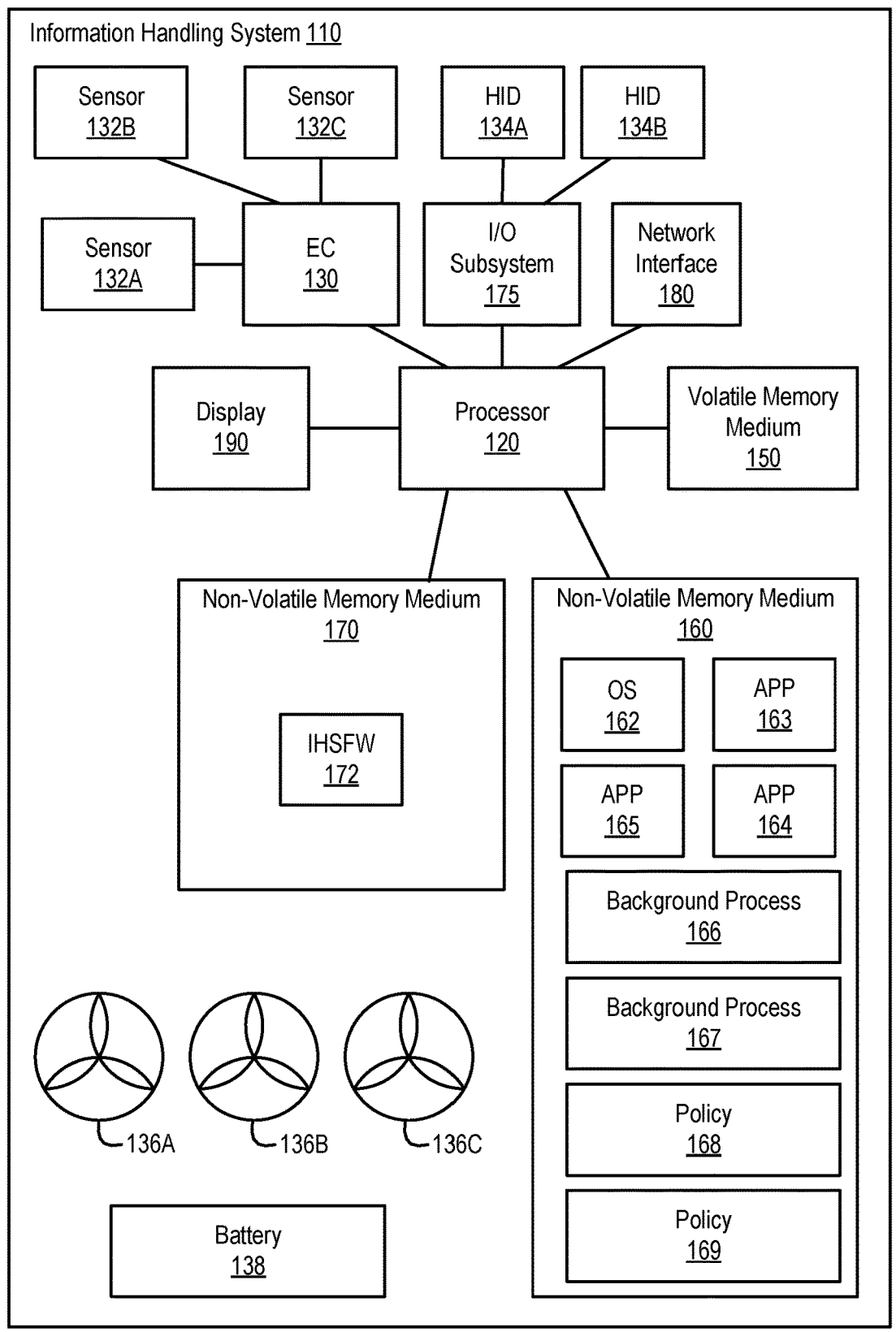

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, various designs of information handling systems are becoming thin and/or slim. For example, various designs of information handling systems, which are configured to be carried by users, are becoming thin and/or slim. In one or more embodiments, reducing sizes of chassis of information handling systems may increase skin temperatures of the information handling systems. For example, a skin temperature may include a temperature of an outer portion of a chassis or a keyboard of an information handling system that is configured to be in contact with a user. In one instance, there may be a maximum safe skin temperature that is safe for a user. In another instance, there may be a maximum comfortable skin temperature that is comfortable for a user. As an example, a temperature above the maximum comfortable skin temperature may be safe for the user to contact (e.g., to touch) but may be uncomfortable to the user.

In one or more embodiments, an information handling system may be configured to operate above the maximum comfortable skin temperature when a user is not in contact with the information handling system. For example, one or more external peripherals (e.g., an external pointing device, an external keyboard, an external headset, etc.) may be utilized with the information handling system. In one instance, the information handling system may be operated on a table (e.g., a desk), and one or more temperatures of one or more outer portions of a chassis of the information handling system may meet or exceed the maximum comfortable skin temperature. In another instance, the information handling system may be utilized with a docking station, and one or more temperatures of one or more outer portions of a chassis of the information handling system may meet or exceed the maximum comfortable skin temperature.

In one or more embodiments, one or more components of an information handling system may affect a skin temperature associated with the information handling system. For example, the one or more components of the information handling system that may affect the skin temperature associated with the information handling system may include one or more of a processor, a graphics processing unit (GPU), a non-volatile memory medium (e.g., a hard disk driver, a solid state drive, etc.), and a network interface, among others. For instance, greater utilization of the one or more components of the information handling system that may affect the skin temperature associated with the information handling system may result in higher skin temperatures.

In one or more embodiments, utilization of the one or more components of the information handling system that may affect the skin temperature associated with the information handling system may be increased as one or more physical interactions of a user with the information handling system decrease. For example, one or more systems, one or more methods, and/or one or more processes described herein may determine the one or more physical interactions of the user with the information handling system. For instance, utilization of the one or more components of the information handling system that may affect the skin temperature associated with the information handling system may be determined based at least on the determined one or more physical interactions of the user with the information handling system. As an example, a performance metric associated with the information handling system may be increased when it is determined that the user not physically interacting with the information handling system or when the user is not physically interacting with one or more portions of the chassis of the information handling system. For instance, a processor of the information handling system may be associated with a clock frequency of 1.8 GHz, and when it is determined that the user not physically interacting with the information handling system or when the user is not physically interacting with the one or more portions of the chassis of the information handling system, the processor may be associated with an increased clock frequency, such as a clock frequency of 4.3 GHz.

In one or more embodiments, a comfort temperature value associated with a user utilizing a keyboard of the information handling system may be fifteen degrees Celsius (15° C.) above an ambient temperature value (e.g., a temperature value proximate to the keyboard). For example, if an ambient temperature value is twenty-eight degrees Celsius (28° C.), a comfort temperature value associated with the user utilizing the keyboard may be forty-three degrees Celsius (43° C.). Although 15° C. above an ambient temperature value is described, other temperature values above the ambient temperature associated with a keyboard and/or one or more portions of the information handling system may be utilized, according to one or more embodiments. In one or more embodiments, a skin temperature value of 43° C. may be a maximum skin temperature value where a user would be comfortable touching a keyboard or another portion of a chassis of the information handling system. For example, the maximum skin temperature value where the user would be comfortable touching the keyboard or the other portion of the chassis of the information handling system may be exceeded when it is determined that the user not physically interacting with the information handling system or when the user is not physically interacting with the one or more portions of the chassis of the information handling system.

In one or more embodiments, an embedded controller (EC) may determine that a human input device (HID) of an information handling system has received user input from a user. In one example, a HID may include a keyboard of the information handling system. In a second example, a HID may include a touchpad of the information handling system. In another example, a HID may include a trackball of the information handling system. In one or more embodiments, the EC may provide information to an operating system (OS) executing on the information handling system. For example, the EC may provide the information to a background process of the OS. For instance, the information may indicate that user input has been received via a HID of the information handling system. In one or more embodiments, the information may include a notification. For example, the EC may provide the notification to the background process of the OS. For instance, the notification may indicate that a user is engaged with the information handling system. In one or more embodiments, the EC may determine that the user has not engaged the information handling system in an amount of time. For example, the notification may indicate that the user is not engaged with the information handling system.

In one or more embodiments, the background process of the OS may include a service of the OS. In one example, the service may include a MICROSOFT® WINDOWS® service. In another example, the background process may include a daemon (e.g., a UNIX® daemon, a Unix-like daemon, etc.). In one or more embodiments, the background process may determine one or more thermal management options and/or one or more component performance management options. For example, the background process or another background process may modify one or more performance configuration states of the information handling system based at least on contextual information provided to the OS. For instance, the other background process may include a service. As an example, the service may include a MICROSOFT® WINDOWS® service. As another example, the other background process may include a daemon (e.g., a UNIX® daemon, a Unix-like daemon, etc.).

In one or more embodiments, the other background process may modify performance capabilities of one or more components of the information handling system based at least on a policy. For example, the other background process may include an INTEL® Dynamic Tuning Technology (DTT), which may receive information and/or a notification and may modify performance capabilities of one or more components of the information handling system based at least on build time policy determinations. In one or more embodiments, the other background process may provide a notification to the EC, which may permit the EC to configure a rate of one or more fans of the information handling system. In one example, the EC may configure a first rate of the one or more fans such that the first rate is lower than a current rate of the one or more fans. For instance, the EC may lower a speed of the one or more fans. In another example, the EC may configure a second rate of the one or more fans such that the second rate is high than a current rate of the one or more fans. For instance, the EC may increase a speed of the one or more fans.

In one or more embodiments, increasing the speed of the one or more fans may reduce or assist in reducing a skin temperature of the information handling system. In one or more embodiments, a background process may receive HID information. For example, the HID information may include state information and/or location information (e.g., internal to an information handling system, external to an information handling system, coupled to a docking station, etc.). For instance, the background process may provide HID information to the EC, which may receive the HID information.

In one or more embodiments, performance of an information handling system may be increased based at least on one or more of an identification of an application, a determination that a HID is external to the information handling system, state information associated with the information handling system, and a determination that the information handling system has not been moved within an amount of time transpiring, among others. For example, performance of the information handling system may be increased via permitting one or more components of the information handling system to consume more power. In one instance, when a processor of the information handling system is permitted to consume more power, the processor may process information faster. In another instance, when a graphics processing unit of the information handling system is permitted to consume more power, the graphics processing unit may render images and/or video faster. As an example, an application that renders images and/or video may perform better when the processor and/or the graphics processing unit processes information faster. As a second example, an application, such as a video conferencing application, may perform better when the processor and/or the graphics processing unit processes information faster. As another example, an application may respond to user input faster when the processor and/or the graphics processing unit processes information faster.

In one or more embodiments, the process may be configured to utilize power limited to an amount of power. In one example, the process may be configured to utilize power limited to a first amount of power. For instance, the first amount of power may be thirty Watts (30 W). As an example, the process may be configured to utilize power limited to the first amount of power if it is determined that a user is in physical contact with at least a portion of the information handling system within an amount of time transpiring. In another example, the process may be configured to utilize power limited to a second amount of power. For instance, the second amount of power may be thirty Watts (60 W). As an example, the process may be configured to utilize power limited to the second amount of power if it is determined that the user is not in physical contact with at least a portion of the information handling system within an amount of time transpiring.

In one or more embodiments, one or more performance metrics associated with IHS 110 and/or one or more thermal profiles may be configured based at least on one or more user interactions with IHS 110. For example, higher performance rates of IHS 110 may be achieved while maintaining acceptable thermal performance and/or acceptable skin temperatures. In one or more embodiments, determining a thermal profile for the information handling system may be based at least on one or more of a determined temperature value associated with the information handling system, a frequency of utilization of a network interface, a brightness value associated with a display of the information handling system, a utilization of a camera of the information handling system, a power state associated with the information handling system, a determination that a battery of the information handling system is being charged, a determination that the battery of the information handling system is being discharged, a determination that the information handling system has been moved within an amount of time transpiring, a determination that the information handling system is docked with a docking station, a workload being processed by a processor and/or by a graphics processing unit of the information handling system, a determination that a lid of the information handling system is closed, a determination that a lid of the information handling system is open, and a determination that indicates that a user is present, among others.

Turning now to FIGS. 1A-1D, examples of an information handling system are illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

Figure 1B:
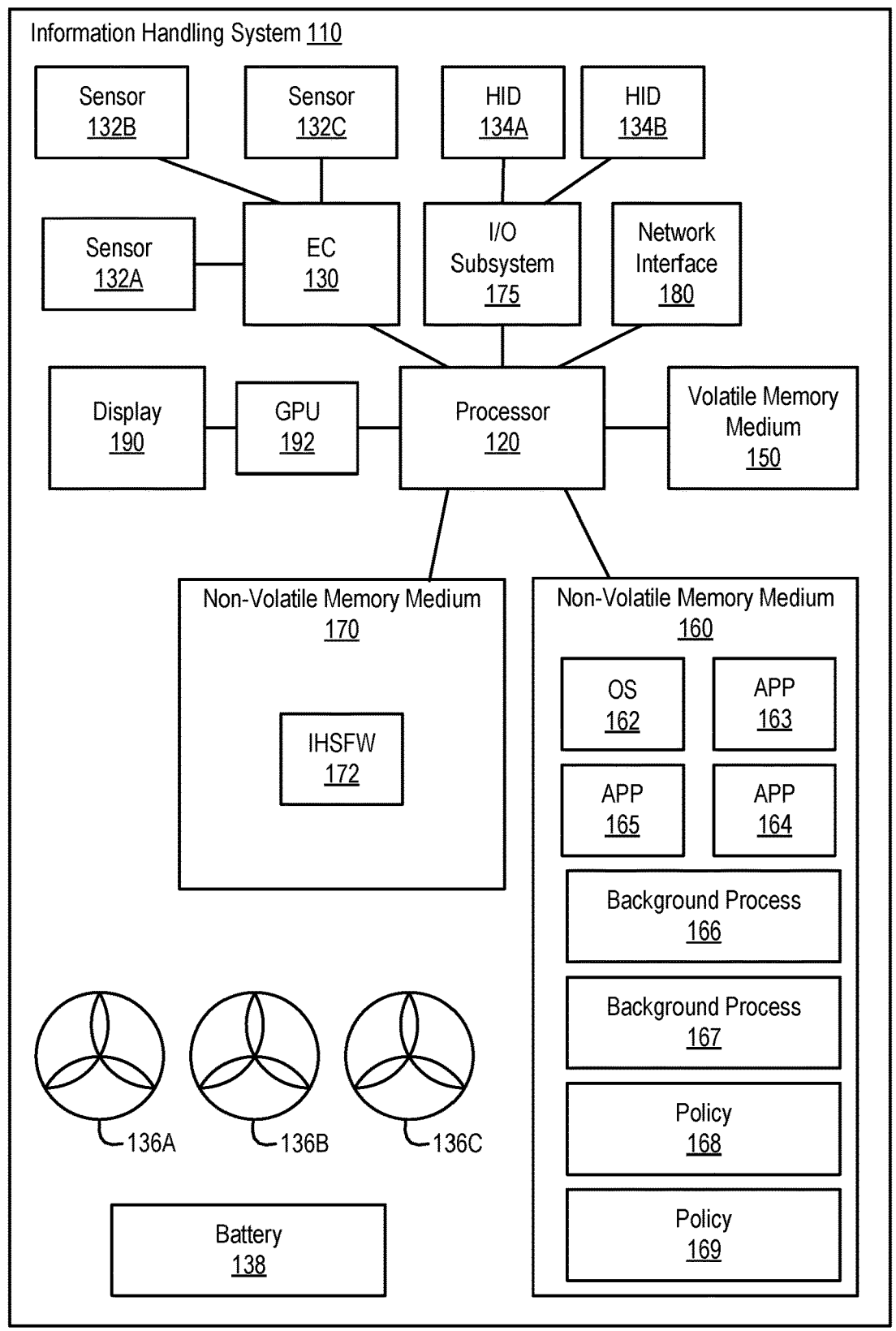

As shown, IHS 110 may include a processor 120, an EC 130, a volatile memory medium 150, non-volatile memory media 160 and 170, an I/O subsystem 175, a network interface 180, and a display 190. As illustrated, EC 130, volatile memory medium 150, non-volatile memory media 160 and 170, I/O subsystem 175, network interface 180, and display 190 may be communicatively coupled to processor 120. In one or more embodiments, IHS 110 may include a graphics processing unit (GPU) 192, as shown in FIG. 1B. For example, GPU 192 may be coupled to processor 120. For instance, display 190 may be coupled to GPU 192.

In one or more embodiments, one or more of EC 130, volatile memory medium 150, non-volatile memory media 160 and 170, I/O subsystem 175, network interface 180, display 190, and GPU 192 may be communicatively coupled to processor 120 via one or more buses, one or more switches, and/or one or more root complexes, among others. In one example, one or more of EC 130, volatile memory medium 150, non-volatile memory media 160 and 170, I/O subsystem 175, network interface 180, display 190, and GPU 192 may be communicatively coupled to processor 120 via one or more PCI-Express (PCIe) root complexes. In another example, one or more of EC 130, I/O subsystem 175 network interface 180, display 190, and GPU 192 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, applications (APPs) 163-165, and background processes 166 and 167. In one or more embodiments, one or more of OS 162, APPs 163-165, and background processes 166 and 167 may include processor instructions executable by processor 120. In one example, processor 120 may execute processor instructions of one or more of OS 162, APPs 163-165, and background processes 166 and 167 via non-volatile memory medium 160. In another example, one or more portions of the processor instructions of the one or more of OS 162, APPs 163-165, and background processes 166 and 167 may be transferred to volatile memory medium 150, and processor 120 may execute the one or more portions of the processor instructions of the one or more of OS 162, APPs 163-165, and background processes 166 and 167 via volatile memory medium 150. In one or more embodiments, non-volatile memory medium 160 may include policies 168 and 169. In one or more embodiments, one or more of policies 168 and 169 may be copied to volatile memory medium 150.

In one or more embodiments, background processes 166 and 167 may respectively include an input detection service (IDS) and a DTT. In one example, the IDS may determine where user input originated. In one instance, the IDS may determine that the user input originated from a HID internal to IHS 110. In another instance, the IDS may determine that the user input originated from a HID external to IHS 110. In another example, the DTT may utilize one or more of policies 168 and 169. For instance, the DTT may utilize one or more of policies 168 and 169 to set one or more power utilization profiles of IHS 110.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, EC 130 may communicate with one or more of background processes 166 (e.g., the IDS) and 167 (e.g., the DTT), among others. For example, EC 130 may communicate with background processes 166 and/or 167 via IHSFW 172. For instance, EC 130 may communicate with background processes 166 and/or 167 via a management information exchange. In one or more embodiments, EC 130 may provide background process 167 with information that indicates an origin of user input from a HID. In one example, the information from EC 130 may indicate that the user input originated from a HID internal to IHS 110. In another example, the information from EC 130 may indicate that the user input originated from a HID external to IHS 110. In one or more embodiments, EC 130 may receive information from background process 166. For example, the information from background process 166 may indicate that user input was received via a HID. For instance, the information from background process 166 may indicate that user input was received via a HID internal to IHS 110.

In one or more embodiments, EC 130 may provide background process 167 with information that indicates a status change. In one example, the information from EC 130 may indicate that a status has changed from a user is physically interacting with IHS 110 to the user is not physically interacting with IHS 110. In one instance, physically interacting with IHS 110 may mean that the user is in physical contact with at least a portion of a chassis of IHS 110 when providing user input and/or when utilizing IHS 110 (e.g., IHS 110 is resting on a lap of the user, the user is holding IHS 110, etc.). In another instance, not physically interacting with IHS 110 may mean that the user is not in physical contact with at least a portion of a chassis of IHS 110 when providing user input or when utilizing IHS 110. As an example, the user may not be in physical contact with at least a portion of a chassis of IHS 110 when providing user input or when utilizing IHS 110 when the user utilizes one or more external HIDs. In one instance, a HID external to IHS 110 may be communicatively coupled to IHS 110 in a wired fashion. In another instance, a HID external to IHS 110 may be communicatively coupled to IHS 110 in a wireless fashion.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, EC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, EC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 130 may be or include an application processor. In one example, EC 130 may be or include an ARM Cortex-A processor. In another example, EC 130 may be or include an Intel Atom processor. In one or more embodiments, EC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

In one or more embodiments, IHS 110 may include one or more sensors. As illustrated, IHS 110 may include sensors 132A-132C. As shown, sensors 132A-132C may be coupled to EC 130. In one or more embodiments, sensors 132A-132C may be at multiple respective locations within IHS 110. In one or more embodiments, a sensor 132 may include a temperature sensor. For example, a sensor 132 may determine a temperature value proximate (e.g., within a small distance) its physical location. In one instance, a sensor 132 may provide, to EC 130, digital data associated with a temperature value proximate to a physical location of sensor 132. In another instance, a sensor 132 may provide, to EC 130, an analog signal associated with a temperature value proximate to a physical location of sensor 132. As an example, EC 130 may include an analog to digital converter (ADC), which may convert the analog signal associated with the temperature value proximate to the physical location of sensor 132 into digital data. In one or more embodiments, a skin temperature value associated with IHS 110 may be determined via a sensor 132. In one or more embodiments, a skin temperature value associated with IHS 110 may be proportional to a temperature value determined via a sensor 132. For example, a skin temperature value associated with IHS 110 may be determined via multiplying a value (e.g., a constant value, a value from a lookup table, etc.) with a temperature value determined via a sensor 132.

In one or more embodiments, a sensor 132 may include a motion sensor. In one or more embodiments, a sensor 132 may determine that IHS 110 has moved. For example, a sensor 132 may include one or more of an electronic accelerometer, an electronic vibration sensor, an electronic gyroscope, an electronic magnetometer, and an electronic inertial measurement device, among others. In one or more embodiments, determining that a user is in contact with IHS 110 may include determining that IHS 110 has moved within an amount of time transpiring. For example, EC 130 may receive a signal from a sensor 132 and may determine that a user is in contact with IHS 110 based at least on the signal from sensor 132. In one instance, the signal from sensor 132 may be a digital signal. In another instance, the signal from sensor 132 may be an analog signal. In one or more embodiments, a sensor 132 may include a distance sensor. For example, a sensor 132 may provide one or more signals associated with a distance from IHS 110 and a user. In one instance, a sensor 132 may include a time of flight distance sensor. In a second instance, a sensor 132 may include a SONAR (sound navigation and ranging) device. In a third instance, a sensor 132 may include a RADAR (radio detection and ranging) device. In another instance, a sensor 132 may include a LIDAR (light detection and ranging) device. In one or more embodiments, a distance from IHS 110 to a user may be determined. For example, if the distance from IHS 110 to the user is greater than a threshold distance or equal to the threshold distance, it may be determined that the user is not in physical contact with IHS 110.

In one or more embodiments, IHS 110 may include one or more human interface devices (HIDs). As shown, IHS 110 may include HIDs 134A and 134B. As illustrated, HIDs 134A and 134B may be coupled to I/O subsystem 175. In one or more embodiments, a HID 134 may include a keyboard, a touchpad, a trackball, a joystick, a touch screen, a fingerprint scanner, or a pointing stick, among others.

In one or more embodiments, IHS 110 may include one or more fans. As illustrated, IHS 110 may include fans 136A-136C. In one example, one or more of fans 136A-136C may draw air into IHS 110. In a second example, one or more of fans 136A-136C may evacuate air from IHS 110. In another example, one or more of fans 136A-136C may circulate air within IHS 110. In one or more embodiments, EC 130 may control one or more of fans 136A-136C. In one example, EC 130 may control turning on and turning off one or more of fans 136A-136C. In another example, EC 130 may control one or more speeds of one or more of fans 136A-136C.

In one or more embodiments, IHS 110 may include a battery 138. For example, battery 138 may store energy. In one instance, battery 138 may provide power, from the stored energy, to one or more components of IHS 110. In another instance, battery 138 may provide power, from the stored energy, to one or more components external to IHS 110. As an example, battery 138 may provide power, from the stored energy, to one or more external HIDs. In one or more embodiments, heat may be generated by battery 138 when battery 138 is being charged and/or when battery 138 is being discharged. For example, heat from battery 138 may increase a skin temperature value associated with IHS 110.

In one or more embodiments, IHS 110 may include a chassis 193, as illustrated in FIG. 1C. In one or more embodiments, chassis 193 may house one or more components of IHS 110. For example, the one or more components of IHS 110 may include one or more of processor 120, EC 130, sensors 132A-132C, HIDs 134A and 134B, volatile memory medium 150, non-volatile memory media 160 and 170, I/O subsystem 175, network interface 180, display 190, and GPU 192, among others. In one or more embodiments, HID 134A may include a touchpad. For example, HID 134A may implement a pointing device. For instance, a pointing device may receive user input to move a cursor. In one or more embodiments, HID 134B may include a keyboard. For example, HID 134B may include multiple keyboard keys 197.

In one or more embodiments, a skin temperature associated with IHS 110 may include a temperature associated with an outer portion of chassis 193. In one example, a first skin temperature may be associated with an outer portion 194A of chassis 193. In a second example, a second skin temperature may be associated with an outer portion 194B of chassis 193. In another example, a third skin temperature may be associated with an outer portion 194C of chassis 193. In one or more embodiments, a skin temperature associated with IHS 110 may include a temperature associated with a HID 134. In one example, a fourth skin temperature may be associated with an outer portion of HID 134A. In another example, a fifth skin temperature may be associated with an outer portion of HID 134B. For instance, the fifth skin temperature may be associated with a key of HID 134B. As an example, a sixth skin temperature may be associated with an outer portion 196A of a keyboard key 197A of HID 134B. As a second example, a seventh skin temperature may be associated with an outer portion 196B of a keyboard key 197B of HID 134B. As another example, an eighth skin temperature may be associated with an outer portion 196C of a keyboard key 197C of HID 134B.

In one or more embodiments, a skin temperature associated with IHS 110 may be proportional to a performance of IHS 110. In one example, if a performance of IHS 110 is higher, a skin temperature associated with IHS 110 may be higher. In another example, if a performance of IHS 110 is lower, a skin temperature associated with IHS 110 may be lower. In one or more embodiments, performance of IHS 110 may be limited if a user is in physical contact with IHS 110.

Figure 1D:
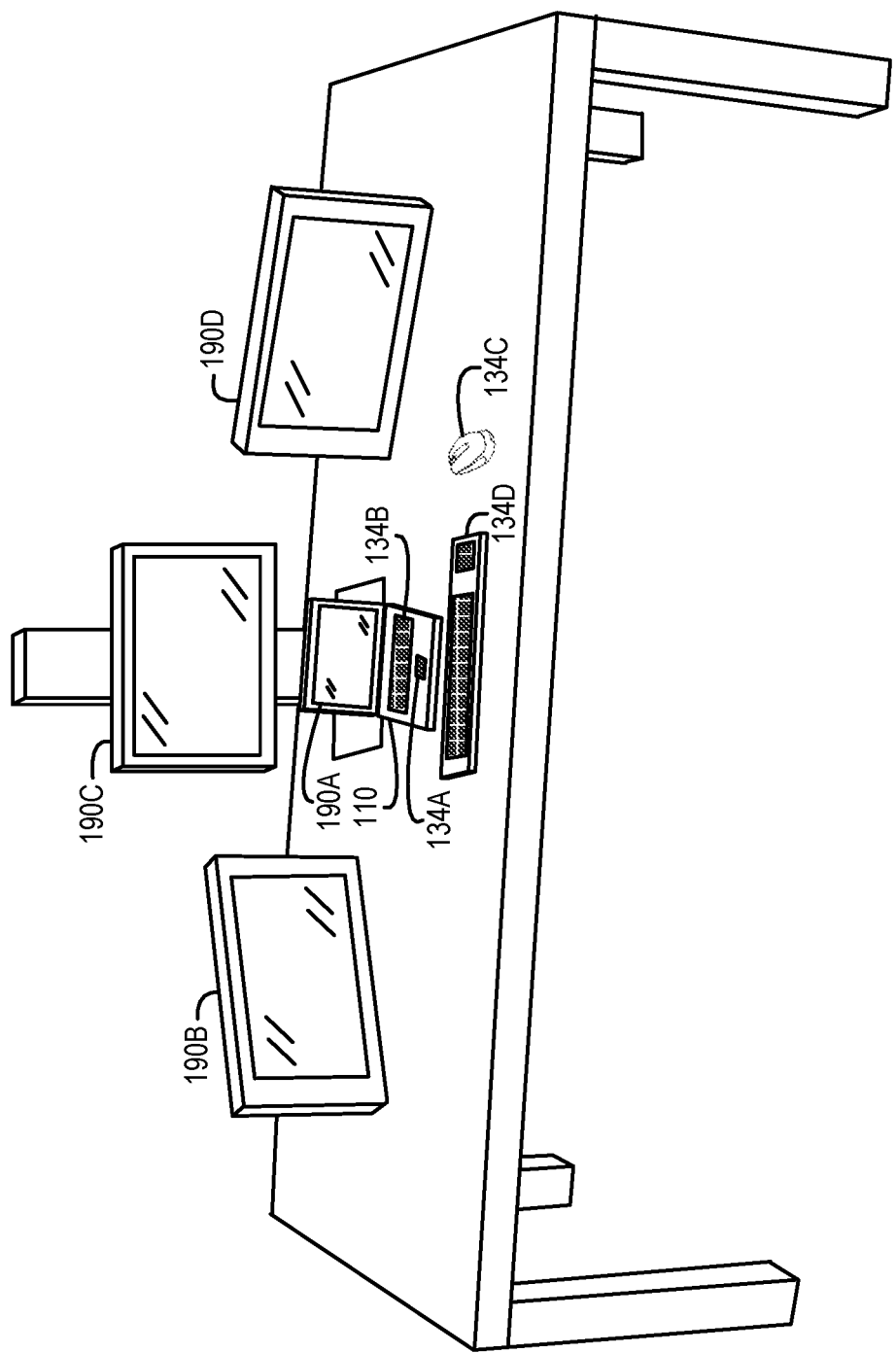

In one or more embodiments, IHS 110 may be coupled to one or more external HIDs 134C and 134D, as illustrated in FIG. 1D. In one example, HID 134C may include an external pointing device. For instance, HID 134C may include an external mouse. In another example, HID 134D may include an external keyboard. In one or more embodiments, it may be determined that a HID 134 is external to IHS 110. For example, it may be determined that one or more of HIDs 134C and 134D are external to IHS 110. In one instance, background process 166 may determine that one or more of HIDs 134A and 134B are internal to IHS 110. In a second instance, background process 166 may determine that one or more of HIDs 134C and 134D are external to IHS 110. In a third instance, EC 130 may determine that one or more of HIDs 134A and 134B are internal to IHS 110. As an example, EC 130 determining that one or more of HIDs 134A and 134B are internal to IHS 110 may include EC 130 receiving information, from background process 166, indicating that one or more of HIDs 134A and 134B are internal to IHS 110. In another instance, EC 130 may determine that one or more of HIDs 134C and 134D are external to IHS 110. As an example, EC 130 determining that one or more of HIDs 134C and 134D are external to IHS 110 may include EC 130 receiving information, from background process 166, indicating that one or more of HIDs 134C and 134D are external to IHS 110.

In one or more embodiments, one or more of HIDs 134C and 134D may be communicatively coupled to IHS 110 in a wired fashion. For example, one or more of HIDs 134C and 134D may be communicatively coupled to IHS 110 via a USB communicative coupling. In one or more embodiments, one or more of HIDs 134C and 134D may be communicatively coupled to IHS 110 in a wireless fashion. For example, one or more of HIDs 134C and 134D may be communicatively coupled to IHS 110 via a radio frequency (RF) communicative coupling. For instance, one or more of HIDs 134C and 134D may be communicatively coupled to IHS 110 via one or more of a wireless protocol associated with an IEEE 802.15 protocol, a wireless protocol associated with a Bluetooth protocol, a wireless protocol associated with a Bluetooth low energy (BLE) protocol, a wireless protocol associated with a Zigbee protocol, a wireless protocol associated with a proprietary wireless protocol, among others. In one or more embodiments, IHS 110 may include a RF receiver that is configured to receive user input via a one or more of HIDs 134C and 134D in a wireless fashion. In one or more embodiments, IHS 110 may include a RF transceiver that is configured to receive user input via a one or more of HIDs 134C and 134D in a wireless fashion.

In one or more embodiments, IHS 110 may display information via one or more displays 190A-190D. In one example, IHS 110 may include display 190A. In another example, displays 190B-190D may be external to IHS 110. For instance, external displays 190B-190D may be communicatively coupled to IHS 110. In one or more embodiments, one or more of displays 190B-190D may be communicatively coupled to IHS 110 in a wired fashion. In one or more embodiments, one or more of displays 190B-190D may be communicatively coupled to IHS 110 in a wireless fashion.

In one or more embodiments, it may be determined that one or more of displays 190B-190D are external to IHS 110. In one example, background process 166 may determine that one or more of display 190A is internal to IHS 110. In a second example, background process 167 may determine that one or more of displays 190B-190D are external to IHS 110. In a third example, EC 130 may determine that display 190A is internal to IHS 110. For instance, EC 130 determining that display 190A is internal to IHS 110 may include EC 130 receiving information, from background process 166, indicating that display 190A is internal to IHS 110. In another example, EC 130 may determine that one or more of displays 190B-190D are external to IHS 110. For instance, EC 130 determining that one or more of displays 190B-190D are external to IHS 110 may include EC 130 receiving information, from background process 167, indicating that one or more of displays 190B-190D are external to IHS 110.

Figure 2:
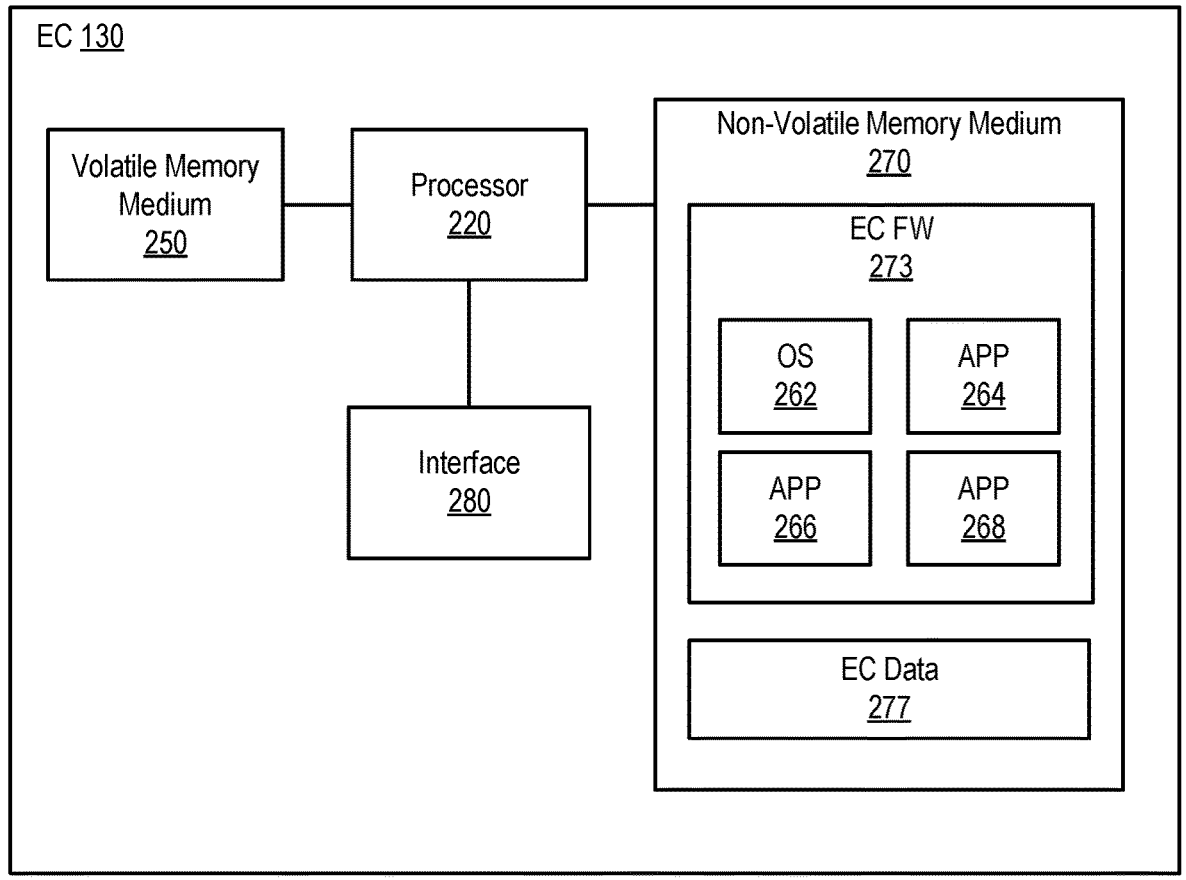
FIG. 2 illustrates an example of an embedded controller, according to one or more embodiments.

Turning now to FIG. 2, an example of an embedded controller is illustrated, according to one or more embodiments. As shown, EC 130 may include a processor 220, a volatile memory medium 250, a non-volatile memory medium 270, and an interface 280. As illustrated, non-volatile memory medium 270 may include a EC firmware (FW) 273, which may include an OS 262 and APPs 264-268, and may include EC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable EC 130 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250.

In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize EC data 277. In one example, processor 220 may utilize EC data 277 via non-volatile memory medium 270. In another example, one or more portions of EC data 277 may be transferred to volatile memory medium 250, and processor 220 may utilize EC data 277 via volatile memory medium 250.

Turning now to FIG. 3, an example of a method of operating an information handling system is illustrated, according to one or more embodiments. At 310, a user may be detected. For example, EC 130 may detect a user. In one or more embodiments, detecting a user may include determining that a user is physically interacting with IHS 110. For example, determining that the user is physically interacting with IHS 110 may include determining that the user is in physical contact with at least a portion of IHS 110. In one instance, determining that the user is physically interacting with IHS 110 may include determining that the user is in physical contact with at least a portion of chassis 193 of IHS 110. In another instance, determining that the user is physically interacting with IHS 110 may include determining that the user is in physical contact with at least a portion of a key 197 of IHS 110.

At 312, a user status may be sent to an IDS. For example, EC 130 may send a user status to background process 166 (e.g., the IDS). For instance, the user status may indicate whether or not the user is physically contacting IHS 110. At 314, it may be determined if the user is present within a first amount of time. If the user is not present within the first amount of time, the method may proceed to 310, according to one or more embodiments. If the user is present within the first amount of time, the IDS (e.g., background process 166) may obtain the user status from the EC (e.g., EC 130), at 316.

At 318, it may be determined if the EC (e.g., EC 130) reports user input. For example, the IDS (e.g., background process 166) may determine if EC 130 reports user input. If the EC (e.g., EC 130) does report user input, the IDS may obtain HID input, the method may proceed to 324, according to one or more embodiments. If the EC (e.g., EC 130) does not report user input, the IDS may obtain HID input, at 320.

At 322, it may be determined if the HID input was received within a second amount of time. For example, the IDS may determine if the HID input was received within the second amount of time. In one instance, the second amount of time may be different from the first amount of time. In another instance, the second amount of time may be the first amount of time. If the HID input was received within the second amount of time, it may be determined that the user is present (e.g., the user is in physical contact with at least a portion of IHS 110), at 324. In one or more embodiments, the method may proceed to 328. If the HID input was not received within the second amount of time, it may be determined that the user is not present (e.g., the user is not in physical contact with at least a portion of IHS 110), at 326.

At 328, a notification may be sent to a DTT. For example, the IDS (e.g., background process 166) may send a notification to a DTT (e.g., background process 167). In one or more embodiments, sending the notification to the IDS may include defining a specific variable, and sending information associated with the specific variable to the DTT. At 330, it may be determined if the user presence has changed. For example, the DTT (e.g., background process 167) may determine if the user presence has changed. If the user presence has changed, a change to a new adaptive profile configuration may occur, at 332. For example, the DTT may change to a new adaptive profile configuration. For instance, the new adaptive profile configuration may change one or more power configurations of IHS 110. In one or more embodiments, policy 168 may include the new adaptive profile configuration. In one example, policy 168 may include first one or more power configurations of IHS 110 for when the user is present (e.g., physically in contact with at least a portion IHS 110). In another example, policy 168 may include second one or more power configurations of IHS 110 for when the user is not present (e.g., not physically in contact with at least a portion IHS 110). If the user present has not changed, the DTT may wait for a change in the user presence, at 334.

Figure 4A:
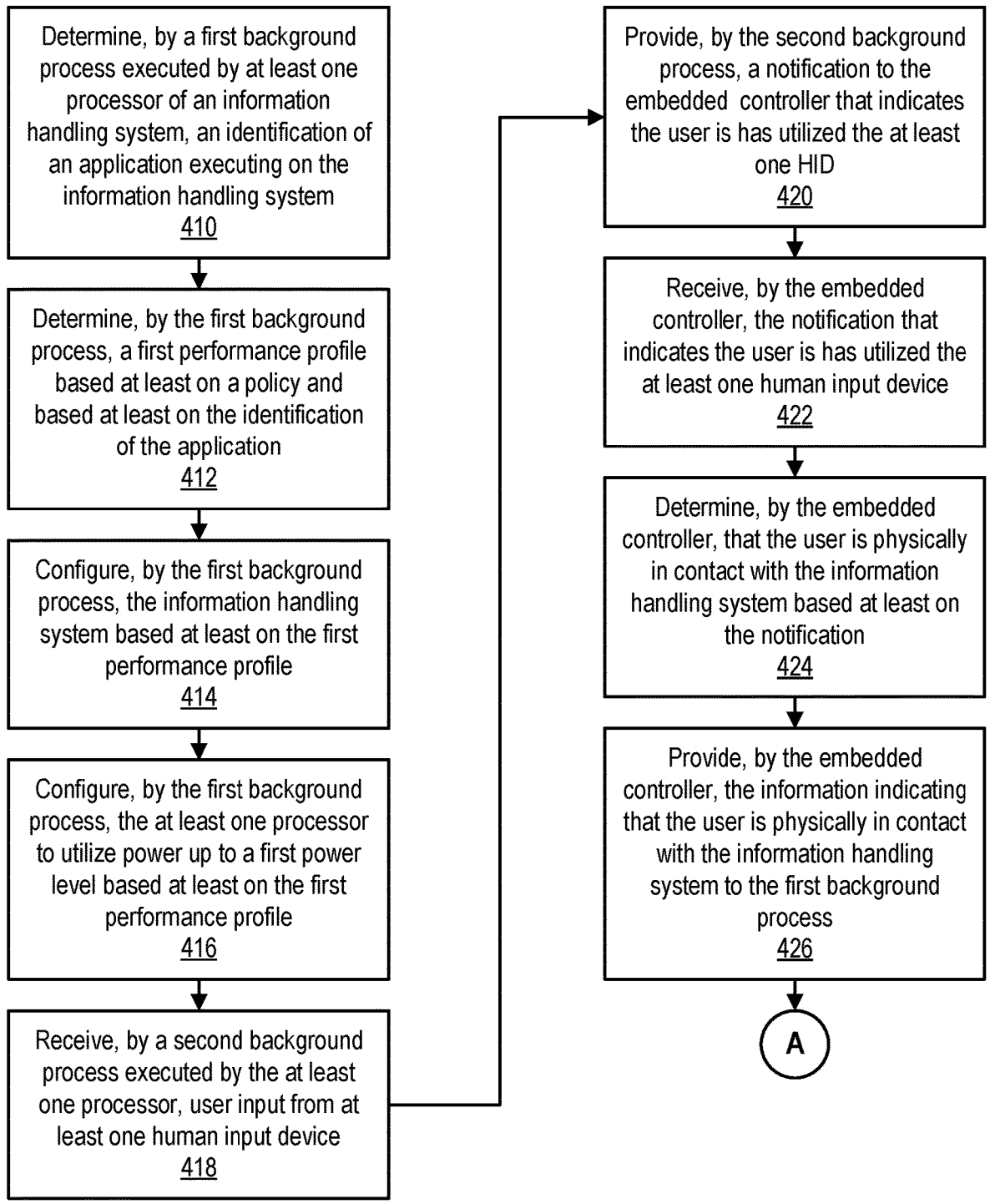
FIGS. 4A and 4B illustrate another example of operating an information handling system, according to one or more embodiments.
Figure 4B:
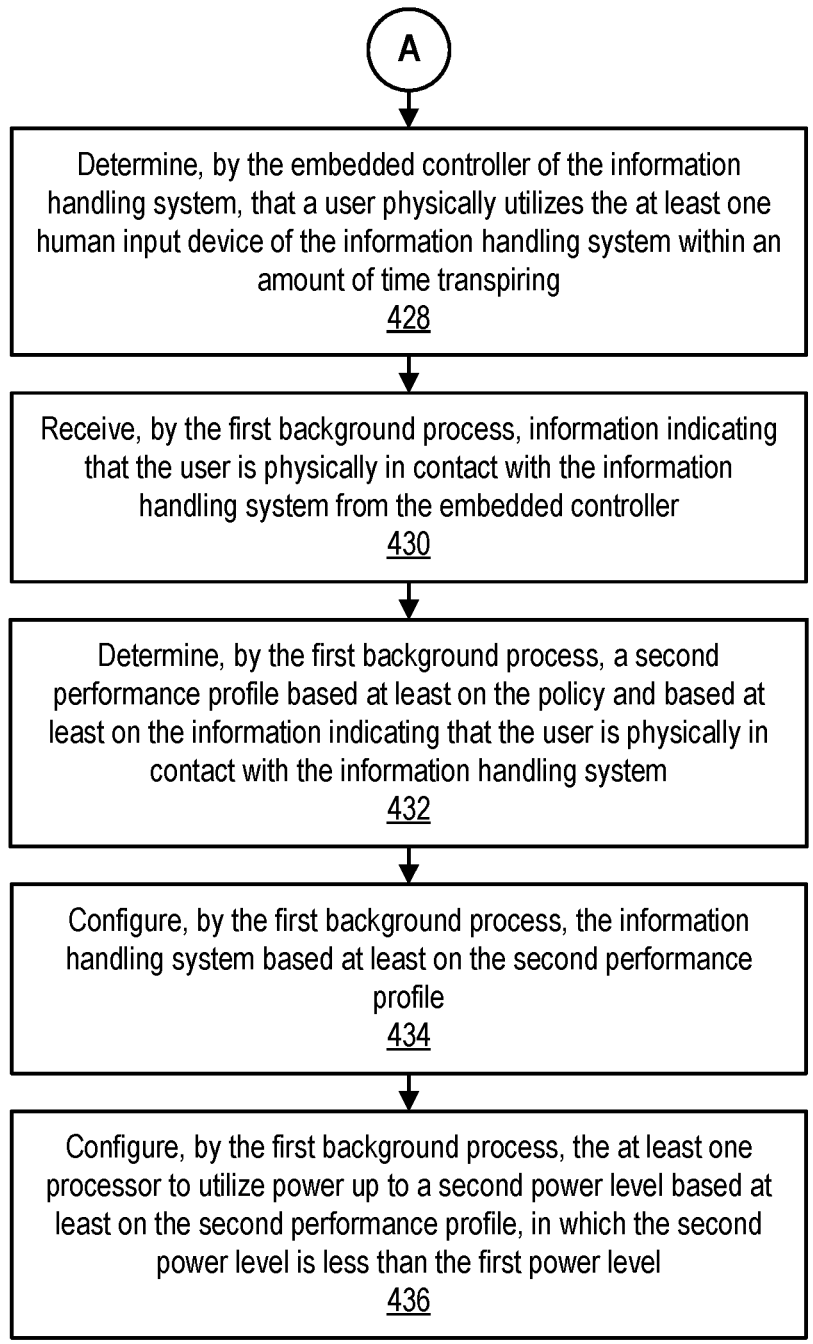

Turning now to FIGS. 4A and 4B, another example of operating an information handling system is illustrated, according to one or more embodiments. At 410, a first background process, executed by at least one processor of an information handling system, may determine an identification of an application executing on the information handling system. For example, background process 167, executed by processor 120, may determine an identification of APP 163 executing on IHS 110. In one instance, APP 163 executing on IHS 110 may include at least a portion of APP 163 being executed by processor 120. In another instance, APP 163 executing on IHS 110 may include at least a portion of APP 163 being executed by GPU 192.

In one or more embodiments, one or more of volatile memory medium 150 and non-volatile memory medium 160 may store one or more software identification (SWID) tags respectively associated with one or more applications. For example, one or more of volatile memory medium 150 and non-volatile memory medium 160 may store SWID tags respectively associated with APPs 163-165. In one or more embodiments, a SWID tag may include information associated with an application. For example, the information associated with an application may include one or more of an identification associated with the application, a version associated with the application, and a producer associated with the application, among others.

At 412, the first background process may determine a first performance profile based at least on a policy and based at least on the identification of the application. For example, background process 167 may determine a first performance profile based at least on policy 168 and based at least on the identification of APP 163. For instance, the identification of APP 163 may include a SWID tag associated with APP 163. In one or more embodiments, background process 167 may determine a first performance profile based at least on policy 168 and based at least on information included in the SWID tag associated with APP 163. For example, background process 167 may determine a first performance profile based at least on policy 168 and based at least on one or more of an identification (e.g., a string of characters) associated with APP 163, a version associated with APP 163, and a producer associated with APP 163, among others.

At 414, the first background process may configure the information handling system based at least on the first performance profile. For example, background process 167 may configure IHS 110 based at least on the first performance profile. In one or more embodiments, configuring the information handling system based at least on the first performance profile may include configuring the information handling system with the first performance profile. In one or more embodiments, configuring the information handling system based at least on the first performance profile may permit a skin temperature associated with the information handling system to reach a first temperature value. In one or more embodiments, the skin temperature associated with IHS 110 may include a temperature associated with an outer portion 194 of chassis 193 and/or an outer portion 196 of a keyboard key 197, among others.

At 416, the first background process may configure the at least one processor to utilize power up to a first power level based at least on the first performance profile. For example, background process 167 may configure processor 120 to utilize power up to a first power level based at least on the first performance profile. In one or more embodiments, configuring the at least one processor based at least on the first performance profile may permit a skin temperature associated with the information handling system to reach the first temperature value.

At 418, a second background process, executed by the at least one processor, may receive user input from the at least one human input device. For example, background process 166 may receive user input from at least one HID 134. At 420, the second background process may provide a notification to an embedded controller of the information handling system that indicates the user has utilized the at least one human input device. For example, background process 166 may provide a notification to EC 130 that indicates the user has utilized the at least one HID 134. In one or more embodiments, the second background process may provide a notification, which indicates the user has utilized the at least one human input device, to the first background process.

At 422, the embedded controller may receive the notification that indicates the user has utilized the at least one human input device. For example, EC 130 may receive the notification that indicates the user has utilized the at least one HID 134. At 424, the embedded controller may determine that the user is physically in contact with the information handling system based at least on the notification. For example, EC 130 may determine that the user is physically in contact with IHS 110 based at least on the notification.

At 426, the embedded controller may provide the information indicating that the user is physically in contact with the information handling system to the first background process. For example, EC 130 may provide the information indicating that the user is physically in contact with the information handling system to background process 167. At 428, the embedded controller may determine that a user physically utilizes at least one human input device of the information handling system within an amount of time transpiring. For example, EC 130 may determine that a user physically utilizes the at least one HID 134 of IHS 110 within an amount of time transpiring. For instance, EC 130 may determine that the at least one HID 134 of IHS 110 is internal to IHS 110. In one or more embodiments, the first background process may determine that a user physically utilizes at least one human input device of the information handling system within an amount of time transpiring. For example, background process 167 may determine that a user physically utilizes the at least one HID 134 of IHS 110 within an amount of time transpiring. For instance, background process 167 may determine that the at least one HID 134 of IHS 110 is internal to IHS 110.

At 430, the first background process may receive information indicating that the user is physically in contact with the information handling system from the embedded controller. For example, background process 167 may receive information indicating that the user is physically in contact with the information handling system from EC 130. At 432, the first background process may determine a second performance profile based at least on the policy and based at least on the information indicating that the user is physically in contact with the information handling system. For example, background process 167 may determine a second performance profile based at least on the policy and based at least on the information indicating that the user is physically in contact with IHS 110. In one or more embodiments, determining the second performance profile based at least on the policy and based at least on the information indicating that the user is physically in contact with the information handling system may be performed in response to receiving the information indicating that the user is physically in contact with the information handling system.

At 434, the first background process may configure the information handling system based at least on the second performance profile. For example, background process 167 may configure IHS 110 based at least on the second performance profile. In one or more embodiments, configuring the information handling system based at least on the second performance profile may include configuring the information handling system with the second performance profile. In one or more embodiments, configuring the information handling system based at least on the second performance profile may permit the skin temperature associated with the information handling system to reach a second temperature value, lower than the first temperature value. For example, configuring the information handling system based at least on the second performance profile may permit the skin temperature associated with the information handling system to be lowered to the second temperature value, less than the first temperature value.

At 436, the first background process may configure the at least one processor to utilize power up to a second power level based at least on the second performance profile, in which the second power level is less than the first power level. In one or more embodiments, configuring the at least one processor to utilize power up to the second power level based at least on the second performance profile may permit the skin temperature associated with the information handling system to reach the second temperature value, lower than the first temperature value. For example, configuring the at least one processor to utilize power up to the second power level based at least on the second performance profile may permit the skin temperature associated with the information handling system to be lowered to the second temperature value or no more than the second temperature value, in which the second temperature value is less than the first temperature value. For instance, configuring at least one of processor 120 and GPU 192 to utilize power up to the second power level based at least on the second performance profile may permit the skin temperature associated with the information handling system to be lowered to the second temperature value or no more than the second temperature value, in which the second temperature value is less than the first temperature value. In one or more embodiments, the skin temperature associated with the information handling system may include a temperature associated with an outer portion 194 of chassis 193 and/or an outer portion 196 of a keyboard key 197, among others.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   an embedded controller coupled to the at least one processor; and
   a memory medium, coupled to the at least one processor, that stores instructions executable by the at least one processor, which when executed by the at least one processor, cause the information handling system to:
      determine, by a first background process executed by the at least one processor, an identification of an application executing on the information handling system;

determine, by the first background process, a first performance profile based at least on a policy and based at least on the identification of the application; and configure, by the first background process, the at least one processor to utilize power up to a first power level based at least on the first performance profile;

wherein the embedded controller is configured to determine that a user physically utilizes at least one human input device (HID) of the information handling system within an amount of time transpiring;

wherein the instructions further cause the information handling system to:

receive, by the first background process, information indicating that the user is physically in contact with the information handling system from the embedded controller;

in response to receiving the information, determine, by the first background process, a second performance profile based at least on the policy and based at least on the information indicating that the user is physically in contact with the information handling system; and configure, by the first background process, the at least one processor to utilize power up to a second power level based at least on the second performance profile, wherein the second power level is less than the first power level.

2. The information handling system of claim 1, wherein the embedded controller is further configured to:

receive a notification that indicates the user has utilized the at least one HID;

determine that the user is physically in contact with the information handling system based at least on the notification; and provide the information indicating that the user is physically in contact with the information handling system to the first background process.

3. The information handling system of claim 2, wherein the instructions further cause the information handling system to:

receive, by a second background process executed by the at least one processor, user input from the at least one HID; and provide, by the second background process, the notification to the embedded controller that indicates the user has utilized the at least one HID.

4. The information handling system of claim 1, wherein the at least one HID includes at least one of a keyboard, a touchpad, and a touch screen.

5. The information handling system of claim 1, wherein the embedded controller is a microcontroller that is physically separate from the at least one processor.

6. The information handling system of claim 1, wherein, to configure, by the first background process, the at least one processor to utilize power up to the second power level based at least on the second performance profile, the instructions further cause the information handling system to reduce, by the first background process, a temperature of at least one outer portion of a chassis of the information handling system.

7. The information handling system of claim 1, wherein, to configure, by the first background process, the at least one processor to utilize power up to the second power level based at least on the second performance profile, the instructions further cause the information handling system to reduce, by the first background process, a temperature of at least one surface of a key of a keyboard of the information handling system.

8. A method, comprising:

determining, by a first background process executed by at least one processor of an information handling system, an identification of an application executing on the information handling system;

determining, by the first background process, a first performance profile based at least on a policy and based at least on the identification of the application;

configuring, by the first background process, the at least one processor to utilize power up to a first power level based at least on the first performance profile;

determining, by an embedded controller of the information handling system, that a user physically utilizes at least one human input device (HID) of the information handling system within an amount of time transpiring;

receiving, by the first background process, information indicating that the user is physically in contact with the information handling system from the embedded controller;

in response to the receiving the information, determining, by the first background process, a second performance profile based at least on the policy and based at least on the information indicating that the user is physically in contact with the information handling system; and configuring, by the first background process, the at least one processor to utilize power up to a second power level based at least on the second performance profile, wherein the second power level is less than the first power level.

9. The method of claim 8, further comprising:

receiving, by the embedded controller, a notification that indicates the user has utilized the at least one HID;

determining, by the embedded controller, that the user is physically in contact with the information handling system based at least on the notification; and providing, by the embedded controller, the information indicating that the user is physically in contact with the information handling system to the first background process.

10. The method of claim 9, further comprising:

receiving, by a second background process executed by the at least one processor, user input from the at least one HID; and providing, by the second background process, the notification to the embedded controller that indicates the user has utilized the at least one HID.

11. The method of claim 8, wherein the at least one HID includes at least one of a keyboard, a touchpad, and a touch screen.

12. The method of claim 8, wherein the embedded controller is a microcontroller that is physically separate from the at least one processor.

13. The method of claim 8, wherein the configuring, by the first background process, the at least one processor to utilize power up to the second power level based at least on the second performance profile includes reducing a temperature of at least one outer portion of a chassis of the information handling system.

14. The method of claim 8, wherein the configuring, by the first background process, the at least one processor to utilize power up to the second power level based at least on the second performance profile includes reducing a temperature of at least one surface of a key of a keyboard of the information handling system.

15. A computer-readable non-transitory memory medium that includes instructions that, when executed by at least one processor of an information handling system, cause the information handling system to:
- determine, by a first background process executed by the at least one processor, an identification of an application executing on the information handling system;
- determine, by the first background process, a first performance profile based at least on a policy and based at least on the identification of the application;
- configure, by the first background process, the at least one processor to utilize power up to a first power level based at least on the first performance profile;
- determine, by the first background process, that a user physically utilizes at least one human input device (HID) of the information handling system within an amount of time transpiring;
- receive, by the first background process, information indicating that the user is physically in contact with the information handling system;
- in response to receiving the information, determine, by the first background process, a second performance profile based at least on the policy and based at least on the information indicating that the user is physically in contact with the information handling system; and
- configure, by the first background process, the at least one processor to utilize power up to a second power level based at least on the second performance profile, wherein the second power level is less than the first power level.

16. The computer-readable non-transitory memory medium of claim 15, wherein the instructions further cause the information handling system to:
- receive, by a second background process executed by the at least one processor, user input from the at least one HID; and
- provide, by the second background process, a notification, which indicates the user has utilized the at least one HID, to the first background process.

17. The computer-readable non-transitory memory medium of claim 15, wherein the at least one HID includes at least one of a keyboard, a touchpad, and a touch screen.

18. The computer-readable non-transitory memory medium of claim 15, wherein, to configure, by the first background process, the at least one processor to utilize power up to the second power level based at least on the second performance profile, the instructions further cause the information handling system to reduce, by the first background process, a temperature of at least one outer portion of a chassis of the information handling system.

19. The computer-readable non-transitory memory medium of claim 15, wherein, to configure, by the first background process, the at least one processor to utilize power up to the second power level based at least on the second performance profile, the instructions further cause the information handling system to reduce, by the first background process, a temperature of at least one surface of a key of a keyboard of the information handling system.

20. The computer-readable non-transitory memory medium of claim 15, wherein, to receive, by the first background process, the information indicating that the user is physically in contact with the information handling system, the instructions further cause the information handling system to receive, by the first background process, the information indicating that the user is physically in contact with the information handling system from an embedded controller of the information handling system.

* * * * *